United States Patent Office.

GIBSON SMITH, OF GROTON JUNCTION, ASSIGNOR TO HIMSELF AND CHARLES W. BANNON, OF ATHOL, MASSACHUSETTS.

Letters Patent No. 109,773, dated November 29, 1870.

IMPROVEMENT IN PERFUMERIES.

The Schedule referred to in these Letters Patent and making part of the same.

*To all whom it may concern:*

Be it known that I, GIBSON SMITH, of Groton Junction, in the county of Middlesex and State of Massachusetts, have invented certain new and useful Improvements in Perfumery; and I do hereby declare that the following is a full, clear, and exact description thereof.

The nature of my invention consists in a composition of perfumery, and mode of preparing the same.

In order to enable others skilled in the art to which my invention appertains to make and use the same, I will now proceed to describe the manner in which the same is or may be manufactured.

With one pound of any or of all the essential oils I mix one pound of glycerine. Then I add three pounds of magnesia alba, and triturate it thoroughly.

This mixture I put into a sealed jar and let it stand for about forty-eight hours. I then add to it three gallons of distilled water and one pound of tincture of storax, and filter the same.

The tincture of storax is designed to fix the active principles or properties of the perfume in the filtered liquid, as otherwise they would quickly escape if exposed to the air.

The advantages of this method are mainly as follows:

The cost of perfumery by this method is reduced in proportion to the price of spirits heretofore used for the purpose of manufacturing.

The perfumery thus made is transparent, will keep any length of time without change, and will not discolor any fabric to which it may be applied.

It can be used to perfume any liquid preparation whatever, thoroughly permeating the same, with no appearance of oil rising upon the top, as is witnessed in all alcoholic preparations of perfumery.

I do not confine myself to the use of tincture of storax alone to fix the active principles of the perfume to the filtered liquid, as I may sometimes use in place thereof essence of ambergris or extract of vanilla, or maybe still other preparations. Neither do I confine myself to the particular proportions of the ingredients above mentioned, as they may be varied to suit circumstances.

Having thus fully described my invention,

What I claim as new, and desire to secure by Letters Patent, is—

A perfumery made of the ingredients in the manner substantially as herein set forth.

In testimony that I claim the foregoing as my own, I affix my signature in presence of two witnesses.

GIBSON SMITH.

Witnesses:
    ABEL L. LAWTON,
    EDWARD LAWTON.